(12) United States Patent
Uken et al.

(10) Patent No.: US 11,453,339 B2
(45) Date of Patent: Sep. 27, 2022

(54) INTERIOR REARVIEW MIRROR ASSEMBLY WITH MULTIFUNCTION LIGHT PIPE

(71) Applicant: Magna Mirrors of America, Inc., Holland, MI (US)

(72) Inventors: John T. Uken, Jenison, MI (US); Austin T. Buerkle, Grand Rapids, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 315 days.

(21) Appl. No.: 15/929,638

(22) Filed: May 14, 2020

(65) Prior Publication Data

US 2020/0361383 A1   Nov. 19, 2020

Related U.S. Application Data

(60) Provisional application No. 62/847,997, filed on May 15, 2019.

(51) Int. Cl.
*B60R 1/12* (2006.01)
*B60R 1/04* (2006.01)
*B60R 1/08* (2006.01)

(52) U.S. Cl.
CPC ............... *B60R 1/12* (2013.01); *B60R 1/04* (2013.01); *B60R 1/083* (2013.01); *B60R 2001/1223* (2013.01)

(58) Field of Classification Search
CPC .. B60R 1/12; B60R 1/04; B60R 1/083; B60R 2001/1223; B60R 1/088
See application file for complete search history.

(56) References Cited

U.S. PATENT DOCUMENTS

| | | | |
|---|---|---|---|
| 3,667,315 A | 6/1972 | Jolly, Sr. | |
| 3,695,210 A | 10/1972 | Stein | |
| 3,737,944 A | 6/1973 | Szabo et al. | |
| 3,813,729 A | 6/1974 | Szabo et al. | |
| 3,908,149 A | 9/1975 | Jergoe et al. | |
| 1,041,301 A | 8/1977 | Pelchat | |
| 4,349,722 A | 9/1982 | Kurth et al. | |
| 4,471,209 A | 9/1984 | Hollander | |
| 4,580,822 A | 4/1986 | Fukumoto | |
| 4,686,741 A | 8/1987 | Moore et al. | |
| 4,712,879 A | 12/1987 | Lynam et al. | |
| 4,837,892 A | 6/1989 | Lo | |

(Continued)

*Primary Examiner* — Sath V Perungavoor
*Assistant Examiner* — Tyler B Edwards
(74) *Attorney, Agent, or Firm* — Honigman LLP

(57) ABSTRACT

A vehicular interior rearview mirror assembly includes a mirror head having a mirror casing and an electro-optic mirror reflective element. A printed circuit board is disposed in the mirror head and includes (i) a light sensor, (ii) an indicator LED and (iii) an electronic switch. A multi-function light pipe is disposed at the mirror head with (i) a first end at the light sensor, the indicator LED and the electronic switch, and (ii) a second end at a perimeter region of the mirror head so as to be viewable and accessible by the driver of the vehicle. The light sensor senses light from rearward of the vehicle via the light pipe. Light emitted by the indicator LED, when energized, is viewable by the driver via the light pipe. The light pipe actuates the electronic switch responsive to a user actuation at the second end of the light pipe.

20 Claims, 4 Drawing Sheets

(56) References Cited

U.S. PATENT DOCUMENTS

| | | |
|---|---|---|
| 4,892,342 A | 1/1990 | Newman et al. |
| 4,914,779 A | 4/1990 | Nakai et al. |
| 5,073,012 A | 12/1991 | Lynam |
| 5,076,673 A | 12/1991 | Lynam et al. |
| 5,117,346 A | 5/1992 | Gard |
| 5,129,694 A | 7/1992 | Tanimoto et al. |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,297,010 A | 3/1994 | Camarota et al. |
| 5,298,306 A | 3/1994 | Miller |
| 5,371,659 A | 12/1994 | Pastrick et al. |
| 5,390,572 A | 2/1995 | Gakhar et al. |
| 5,398,369 A | 3/1995 | Heinzelman et al. |
| 5,406,414 A | 4/1995 | O'Farrell et al. |
| 5,497,305 A | 3/1996 | Pastrick et al. |
| 5,525,264 A | 6/1996 | Cronin et al. |
| 5,530,989 A | 7/1996 | Remmert et al. |
| 5,567,360 A | 10/1996 | Varaprasad et al. |
| 5,610,756 A | 3/1997 | Lynam et al. |
| 5,651,163 A | 7/1997 | Tamaki |
| 5,668,663 A | 9/1997 | Varaprasad et al. |
| 5,669,699 A | 9/1997 | Pastrick et al. |
| 5,671,996 A | 9/1997 | Bos et al. |
| 5,709,453 A | 1/1998 | Krent et al. |
| 5,724,187 A | 3/1998 | Varaprasad et al. |
| 5,740,586 A | 4/1998 | Gomas |
| 5,769,209 A | 6/1998 | Massey, III |
| 5,781,958 A | 7/1998 | Meessmann et al. |
| 5,823,654 A | 10/1998 | Pastrick et al. |
| 5,857,241 A | 1/1999 | Camp, Jr. et al. |
| 5,910,854 A | 6/1999 | Varaprasad et al. |
| 5,938,321 A | 8/1999 | Bos et al. |
| 5,956,799 A | 9/1999 | Panaccione et al. |
| 6,002,544 A | 12/1999 | Yatsu |
| 6,018,841 A | 2/2000 | Kelsay et al. |
| 6,036,244 A | 3/2000 | Tyves et al. |
| 6,070,998 A | 6/2000 | Jennings et al. |
| 6,086,229 A | 7/2000 | Pastrick |
| 6,135,621 A | 10/2000 | Bach et al. |
| 6,139,172 A | 10/2000 | Bos et al. |
| 6,149,287 A | 11/2000 | Pastrick et al. |
| 6,152,590 A | 11/2000 | Furst et al. |
| 6,154,306 A | 11/2000 | Varaprasad et al. |
| 6,164,805 A | 12/2000 | Hulse |
| 6,176,602 B1 | 1/2001 | Pastrick et al. |
| 6,178,034 B1 | 1/2001 | Allemand et al. |
| 6,180,212 B1 | 1/2001 | Single et al. |
| 6,209,933 B1 | 4/2001 | Ang et al. |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,464,805 B2 | 10/2002 | Matsuda et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,690,268 B2 | 2/2004 | Schofield et al. |
| 6,907,643 B2 | 6/2005 | Koops et al. |
| 6,977,619 B2 | 12/2005 | March et al. |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,360,932 B2 | 4/2008 | Uken et al. |
| 7,407,203 B2 | 8/2008 | Huizenga et al. |
| 7,635,210 B2 | 12/2009 | Metros et al. |
| 8,049,640 B2 | 11/2011 | Uken et al. |
| 8,277,059 B2 | 10/2012 | McCabe et al. |
| 8,333,492 B2 | 12/2012 | Dingman et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,764,256 B2 | 7/2014 | Foote et al. |
| 8,786,401 B2 | 7/2014 | Sobecki et al. |
| 8,801,245 B2 | 8/2014 | De Wind et al. |
| 8,917,437 B2 | 12/2014 | Baur et al. |
| 9,290,970 B2 | 3/2016 | De Wind et al. |
| 9,346,403 B2 | 5/2016 | Uken et al. |
| 9,484,626 B2 | 11/2016 | Dykhouse |
| 9,598,016 B2 | 3/2017 | Blank et al. |
| 10,569,697 B2 | 2/2020 | Huizen et al. |
| 2003/0043589 A1* | 3/2003 | Blank .................. B60Q 1/2665 362/276 |
| 2003/0095416 A1 | 5/2003 | Huizenga |
| 2004/0022065 A1 | 2/2004 | Assinder et al. |
| 2007/0053195 A1 | 3/2007 | Alberti |
| 2007/0195542 A1 | 8/2007 | Metros et al. |
| 2007/0206388 A1 | 9/2007 | Misawa et al. |
| 2007/0230201 A1 | 10/2007 | Oba et al. |
| 2007/0258258 A1 | 11/2007 | Wang |
| 2010/0007463 A1 | 1/2010 | Dingman et al. |
| 2010/0088855 A1 | 4/2010 | Ruse et al. |
| 2010/0321945 A1 | 12/2010 | Lang et al. |
| 2010/0321946 A1 | 12/2010 | Dingman et al. |
| 2011/0148575 A1 | 6/2011 | Sobecki et al. |
| 2012/0106182 A1 | 5/2012 | Minter et al. |
| 2012/0127746 A1 | 5/2012 | Lee |
| 2013/0242586 A1 | 9/2013 | Huizen et al. |
| 2014/0313563 A1 | 10/2014 | Uken et al. |
| 2015/0097955 A1 | 4/2015 | De Wind et al. |
| 2015/0224919 A1 | 8/2015 | Sobecki et al. |
| 2019/0106051 A1 | 4/2019 | Huizen et al. |
| 2020/0102773 A1 | 4/2020 | Sobecki |
| 2020/0130646 A1 | 4/2020 | Peterson |
| 2021/0293061 A1 | 9/2021 | Blank et al. |

* cited by examiner

INTERIOR REARVIEW MIRROR ASSEMBLY WITH MULTIFUNCTION LIGHT PIPE

CROSS REFERENCE TO RELATED APPLICATION

The present application claims the filing benefits of U.S. provisional application Ser. No. 62/847,997, filed May 15, 2019, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle. Such mirror assemblies may comprise electrochromic mirror reflective elements that include a glare light sensor for sensing light rearward of the vehicle.

SUMMARY OF THE INVENTION

The present invention provides an interior rearview mirror assembly that comprises a variable dimming electro-optic mirror reflective element and a printed circuit board disposed in the mirror head and having (i) a light sensor, (ii) an indicator light emitting diode (LED) and (iii) a switch or button (that is activated via pressing the switch or button or otherwise physically moving a portion of the switch or button relative to the substrate of the printed circuit board). A multi-function light pipe or conduit or guide is disposed at the mirror head with (i) a first end disposed at and spanning or encompassing at least part of each of the light sensor, the indicator LED and the switch, and (ii) a second end disposed at a perimeter region of the mirror head so as to be viewable and accessible by a driver of the vehicle when the mirror assembly is mounted at an interior portion of a vehicle. The light sensor senses light from rearward of the vehicle via the light pipe, and light emitted by the indicator LED, when energized, is viewable by the driver of the vehicle via the light pipe, and the light pipe actuates the switch responsive to a user actuation at the second end of the light pipe.

These and other objects, advantages, purposes and features of the present invention will become apparent upon review of the following specification in conjunction with the drawings.

DESCRIPTION OF THE PREFERRED EMBODIMENTS

Figure 1:
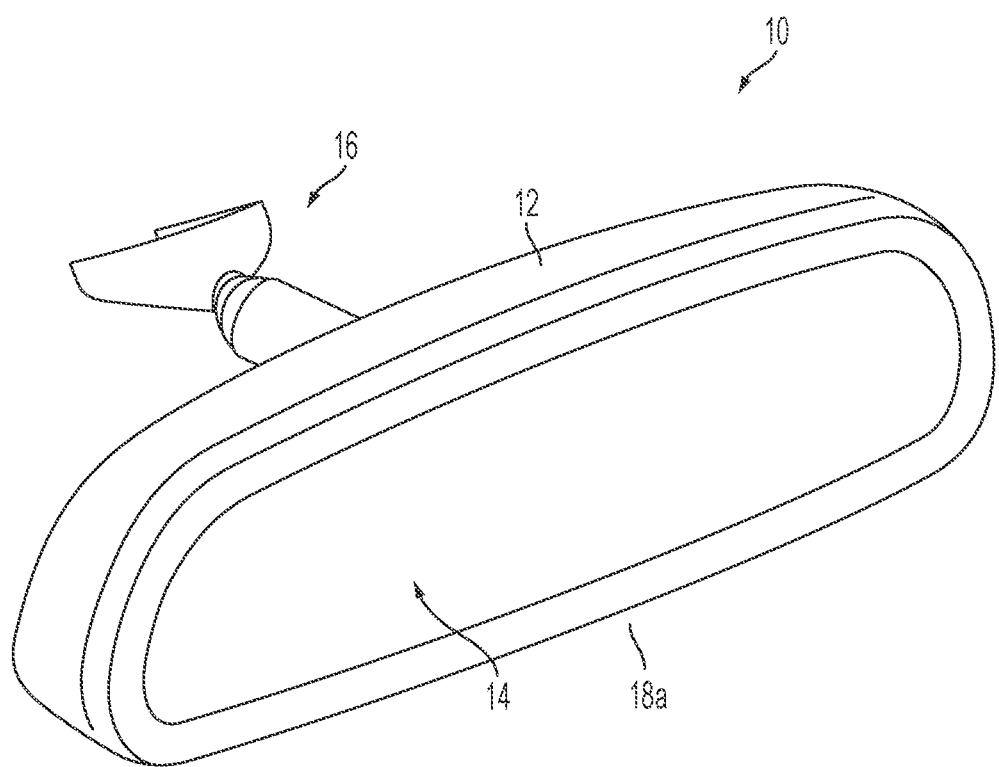
FIG. 1 is a perspective view of an interior rearview mirror assembly in accordance with the present invention.
Figure 2:
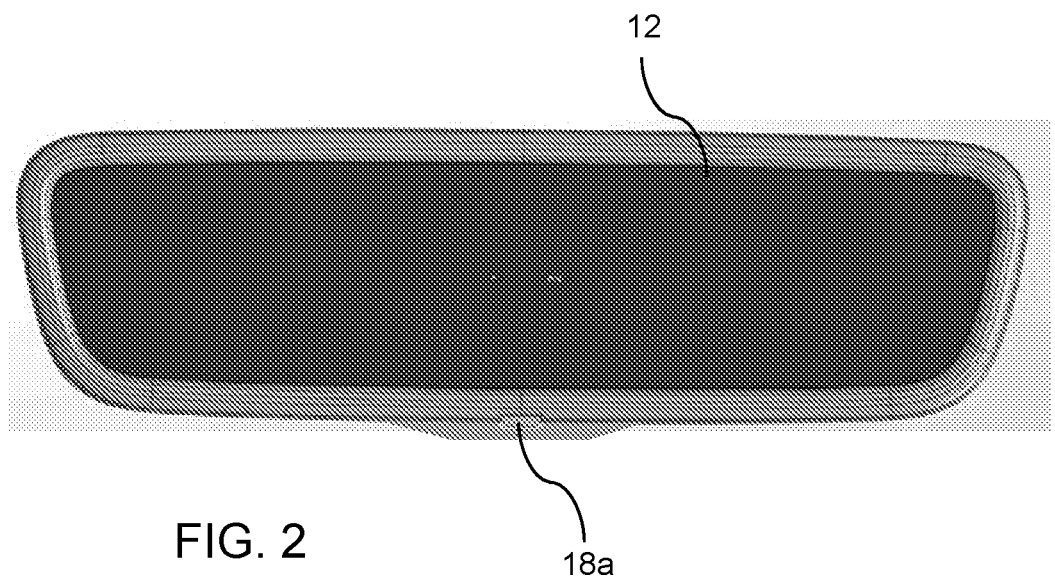
FIG. 2 is a front plan view of the mirror assembly of FIG. 1.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror assembly may comprise an electro-optic or electrochromic mirror assembly that includes an electro-optic or electrochromic reflective element. The mirror assembly includes a light pipe or light conduit or light guide 18 that has an end 18a at a portion of the mirror head (comprising the casing 12 and the reflective element 14) that faces generally rearward of the vehicle when the mirror assembly is mounted at the vehicle, such as at an in-cabin surface of a windshield of the vehicle. The light pipe functions as a light pipe and as a switch actuator, as discussed below.

The mirror reflective element may comprise a low-cost or reduced cost electrochromic mirror reflective element that is opaque (i.e., the rear or fourth surface of the rear substrate has an opaque coating disposed thereat or the mirror reflector at the third surface of the rear substrate is non-transmissive of visible light) so no through-cell sensing of light by a light sensor at the rear of the reflective element is possible. In such a mirror construction, a minimized printed circuit board may have its components (including the glare light sensor for the mirror reflective element drive circuitry) all on one side (the side facing away from the mirror reflective element), and all surface mounted.

Figure 3:
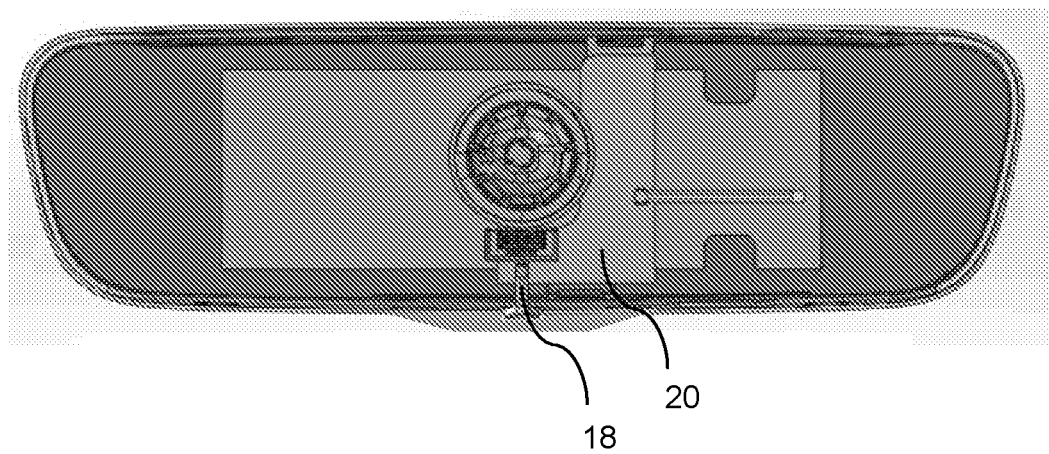
FIG. 3 is a rear plan view of the mirror assembly of FIG. 1, with the mirror casing removed.
Figure 4:
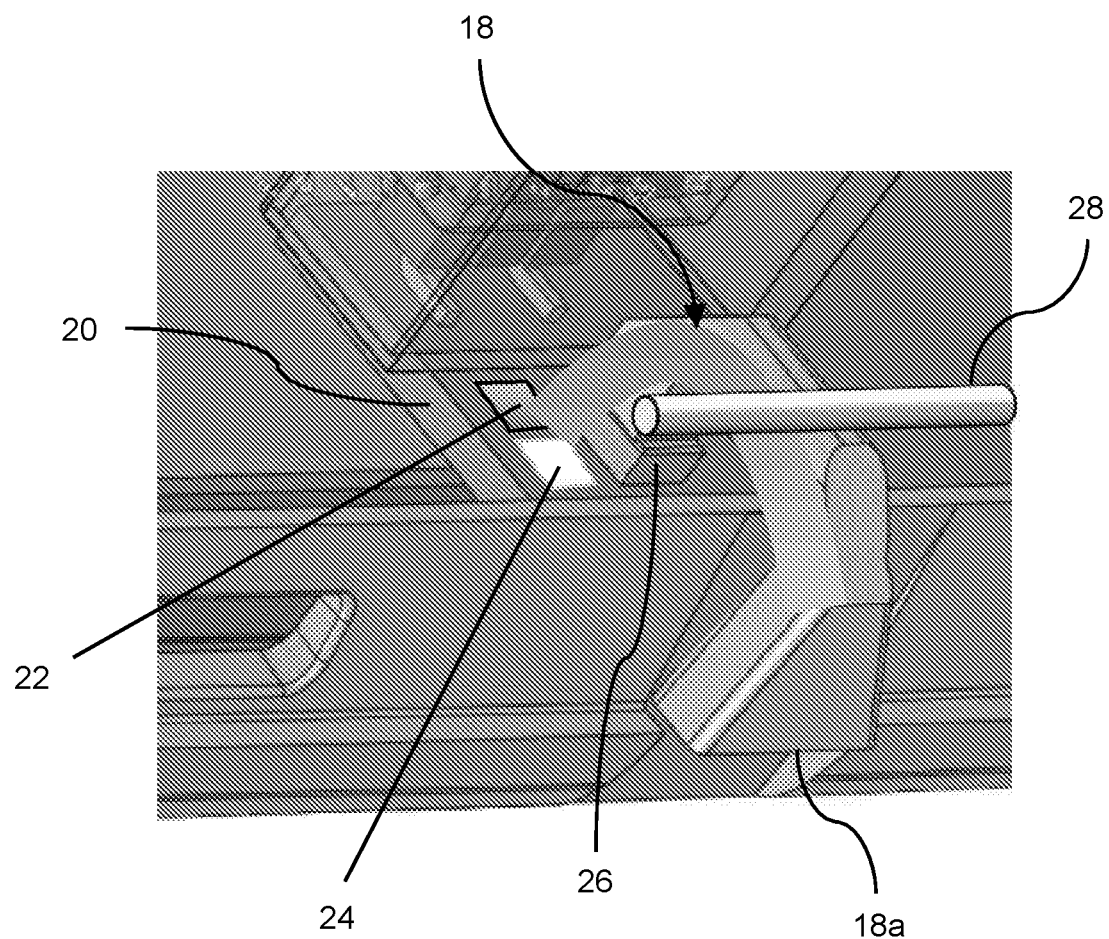
FIG. 4 is perspective view of the light pipe and switch device at the lower portion of the mirror assembly, shown with the mirror casing removed.

As shown in FIGS. 3 and 4, the interior rearview mirror assembly includes circuitry therein. In the illustrated embodiment, and such as shown in FIG. 4, the mirror head has a printed circuit board 20 disposed within the mirror casing and attached at a mirror back plate at the rear side of the mirror reflective element. The printed circuit board has a switch or button 22, an indicator light emitting diode (LED) 24, and a light sensor 26 disposed at a rear side of the printed circuit board (the side facing away from the reflective element and toward the front of the vehicle when the mirror assembly is installed in the vehicle). The end of the light pipe at the printed circuit board at least partially encompasses or at least partially spans or covers the sensor at the printed circuit board. The light pipe 18 functions to guide light that emanates from rearward of the vehicle and that is received at the lower region of the mirror head (see FIG. 1) to the light sensor 26 disposed at the opposite side of the printed circuit board, such that the light sensor senses light rearward of the vehicle, such as glare light for use in controlling the dimming of the electrochromic mirror reflective element. The light pipe 18 thus is used for glare sensing so that sensor can be on the back side of the PCB, facing the opposite direction. The light pipe extends below the EC Cell to gain the field of view needed for glare light, and redirects the received glare light to the sensor. As shown in FIG. 4, the light receiving end 18a of the light pipe 18 may be disposed at a notch or channel at the mirror casing or bezel.

The end of the light pipe at the printed circuit board also at least partially encompasses or at least partially spans or covers the indicator LED 24, such that light emitted by the indicator LED 24 passes along the light pipe so as to be visible at the lower region of the mirror head (see FIG. 1).

Thus, the same light pipe that is used for the glare sensor is also used as an EC On/Off indicator by lighting it with an LED right next to the glare light sensor. The light emitted by the indicator LED thus uses the same optics or optical element as used to direct in-coming light (from rearward of the vehicle) to backlight a diffused on/off symbol on the face or end 18a of the light pipe at the portion of the mirror assembly viewed by the driver of the vehicle.

The end of the light pipe at the printed circuit board also at least partially encompasses or at least partially spans or covers or is disposed at the switch 22. The light pipe is pivotally or movably mounted at the mirror head (such as at the mirror casing or at a structure attached at the printed circuit board or at other structure fixedly disposed in the mirror head and fixed or non-movable relative to the mirror casing and/or printed circuit board) and may pivot about a hinge pin 28, such that when a user presses the end 18a of the light pipe at the lower region of the mirror head, the light pipe structure pivots to actuate the switch 22 at the rear side of the printed circuit board 20. The light-pipe thus may utilize a hinge pin or similar type mechanism to transmit the push force at the lower region of the mirror head to a standard tact switch mounted at the printed circuit board near the indicator LED and light sensor.

The switch (such as a tactile switch or push button type switch) may be actuatable or switched to activate and/or deactivate an electronic function associated with the mirror assembly or vehicle. For example, the switch may be actuatable to actuate an electro-optic dimming function of the mirror reflective element, whereby electro-optic control circuitry operates to dim or darken the mirror reflective element responsive to an output of the glare sensor (and responsive to an output of a separate ambient light sensor of the mirror or of the vehicle). A second actuation of the switch may then deactivate the electro-optic dimming function of the mirror reflective element.

Thus, for example, when a user pushes against the viewed or exposed end of the light pipe, the light pipe pivots about the pivot pin or hinge pin, and the opposite end of the light pipe moves relative to the switch and circuit board to actuate the switch at the circuit board. The switch may actuate a function (such as the electrochromic dimming of the mirror reflective element) via a first pressing of the light pipe and may deactivate the function via a second pressing of the light pipe. The shape of the light pipe and the location of the hinge pin are selected to provide the desired pivotal movement of the light pipe and desired or sufficient mechanical advantage so that a user can readily and/or gently press the exposed end of the light pipe to cause the appropriate movement of the opposite end to actuate or deactuate the electronic switch.

To enable the light sensor and LED indicator to operate at the same time, specific sensing and LED pulse timing is used, such that the sensor 26 will only detect glare light when the indicator LED 24 is fully off during normal PWM (pulse width modulation) operation, making sure sensing and LED are always out-of-phase with each other. In other words, the indicator LED is PWM driven, and uses the light pipe, and the rear-facing light sensor senses only when the LED is off (out of phase) so that LED light does not affect the glare light level received. If the indicator LED uses phosphors, then the system may take into account the time it takes for the phosphors and LED to get to full dark before sensing light with the sensor, or the system may not use an indicator LED with phosphors if it is too slow to dim. The light pipe may also or otherwise comprise baffling or shuttering (that may block or shield the end of the light pipe from the LED) to limit or preclude light emitted by the LED from being sensed by the sensor.

Figure 5:
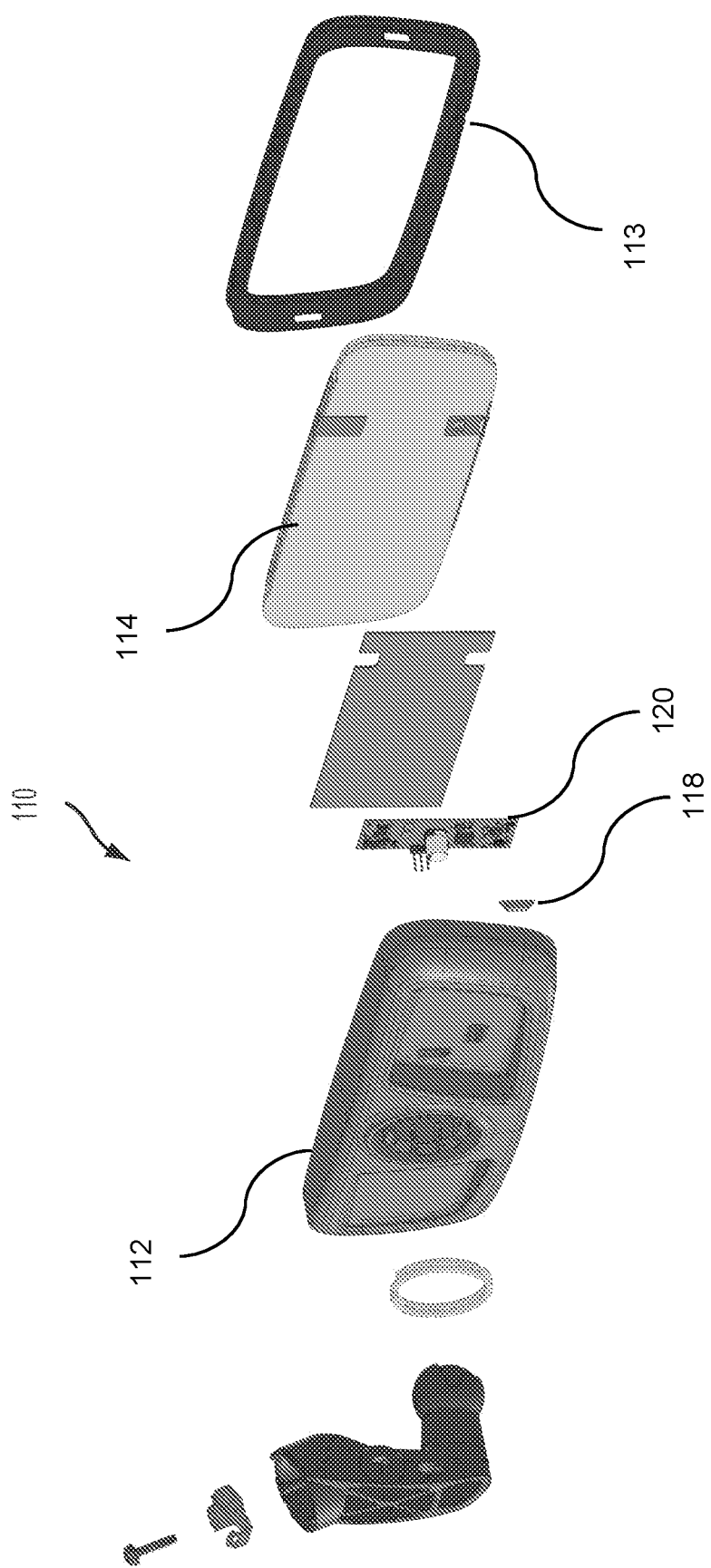
FIG. 5 is an exploded perspective view of another mirror assembly that includes a light pipe to direct glare light to a photosensor disposed at the printed circuit board.

Optionally, and such as shown in FIG. 5, a mirror assembly 110 includes a light pipe 118 that is disposed at the rear side of the printed circuit board 120. The light pipe 118 has one end at a glare light sensor at the PCB 120 and extends outboard or downward from the PCB 120 so that a light receiving end of the light pipe 118 is at a notch or channel 113 at the bezel of the mirror casing 112. The light pipe 118 may be pivotally mounted at the PCB 120 and may be contacted and pivoted by a user to actuate a switch at the PCB 120, such as in a similar manner as discussed above. Optionally, the light pipe may also align with an LED at the PCB to provide an indicator function when the LED is activated or energized.

As shown in FIG. 5, the PCB 120 may electrically connect to terminals of the electrochromic mirror reflective element 114, and may have electrical connecting terminals that protrude rearward through the mirror casing for electrical connection to a wire harness connector of the vehicle. The light pipe 118 allows for the PCB to be attached at the rear of the reflective element with the circuitry (e.g., the light sensor and electrical connections and the like) disposed at one side of the PCB (the side that faces away from the rear of the reflective element).

The light pipe thus comprises a multifunction light pipe and on/off switch. The light pipe/button hinge pin snaps into the mirror casing, such that pushing on the face of the button (light pipe) rotates the light pipe and actuates the tact switch at the rear side of the printed circuit board. The face of the button/light pipe may have engraving or graphics showing an on/off symbol with a textured finish, so it diffuses light and appears backlit. The rest of the light-pipe may be clear and appear dark.

The electrochromic mirror element of the electrochromic mirror assembly may utilize the aspects of the mirror assemblies described in U.S. Pat. Nos. 7,274,501; 7,255, 451; 7,195,381; 7,184,190; 6,690,268; 5,140,455; 5,151, 816; 6,178,034; 6,154,306; 6,002,544; 5,567,360; 5,525, 264; 5,610,756; 5,406,414; 5,253,109; 5,076,673; 5,073, 012; 5,117,346; 5,724,187; 5,668,663; 5,910,854; 5,142,407 and/or 4,712,879, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529, 108, which are hereby incorporated herein by reference in their entireties) or such as a mirror assembly having a rear substrate of an electro-optic or electrochromic reflective element nested in the mirror casing, and with the front substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic mirrors of such construction commercially available from the assignee of this application under the trade name INFINITY™ mirror).

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
   a mirror head pivotally mounted at a mounting structure configured to attach at an interior portion of a vehicle equipped with the vehicular interior rearview mirror assembly;
   wherein the mirror head comprises a mirror casing and a mirror reflective element;
   wherein the mirror reflective element comprises an electrically dimmable electro-optic mirror reflective element;
   a printed circuit board disposed in the mirror head and having (i) a light sensor, (ii) an indicator light emitting diode (LED) and (iii) an electronic switch;
   wherein the printed circuit board is disposed behind the mirror reflective element and has a front side that faces toward the mirror reflective element and a rear side that faces away from the mirror reflective element;
   wherein the light sensor, the indicator LED and the electronic switch are disposed at the rear side of the printed circuit board that faces away from the mirror reflective element;
   a multi-function light pipe disposed at the mirror head with (i) a first end disposed at the light sensor, the indicator LED and the electronic switch, and (ii) a second end disposed at a perimeter region of the mirror head so as to be viewable and accessible by a driver of the vehicle when the mounting structure is attached at the interior portion of the vehicle;
   wherein the light sensor senses light from rearward of the vehicle via light from rearward of the vehicle entering the light pipe at the second end of the light pipe and exiting the light pipe at the first end of the light pipe at which the light sensor is disposed;
   wherein light emitted by the indicator LED, when energized, enters the first end of the light pipe and exits the second end of the light pipe and is viewable by the driver of the vehicle via the driver viewing the second end of the light pipe; and
   wherein the first end of the light pipe actuates the electronic switch responsive to a user actuation at the second end of the light pipe.

2. The vehicular interior rearview mirror assembly of claim 1, wherein the indicator LED and the light sensor operate out of phase from one another.

3. The vehicular interior rearview mirror assembly of claim 2, wherein the light sensor senses light when the indicator LED is fully off.

4. The vehicular interior rearview mirror assembly of claim 3, wherein the indicator LED is pulsed on and off via pulse width modulation operation.

5. The vehicular interior rearview mirror assembly of claim 1, wherein the light pipe is pivotally mounted at the mirror head and pivots responsive to the user actuation at the second end of the light pipe.

6. The vehicular interior rearview mirror assembly of claim 1, wherein the light sensor comprises a glare light sensor and senses glare light for electronic dimming control of the mirror reflective element.

7. The vehicular interior rearview mirror assembly of claim 1, wherein the mirror reflective element comprises an electrochromic mirror reflective element.

8. The vehicular interior rearview mirror assembly of claim 1, wherein the perimeter region of the mirror head comprises a region below the mirror reflective element.

9. The vehicular interior rearview mirror assembly of claim 1, wherein the printed circuit board is disposed at and is parallel to a rear surface of the mirror reflective element.

10. A vehicular interior rearview mirror assembly, the vehicular interior rearview mirror assembly comprising:
    a mirror head pivotally mounted at a mounting structure configured to attach at an interior portion of a vehicle equipped with the vehicular interior rearview mirror assembly;
    wherein the mirror head comprises a mirror casing and a mirror reflective element;
    wherein the mirror reflective element comprises an electrically dimmable electro-optic mirror reflective element;
    a printed circuit board disposed in the mirror head and having (i) a light sensor and (ii) an electronic switch;
    wherein the printed circuit board is disposed behind the mirror reflective element and has a front side that faces toward the mirror reflective element and a rear side that faces away from the mirror reflective element;
    wherein the light sensor and the electronic switch are disposed at the rear side of the printed circuit board that faces away from the mirror reflective element;
    a multi-function light pipe disposed at the mirror head with (i) a first end disposed at the light sensor and the electronic switch, and (ii) a second end disposed at a perimeter region of the mirror head so as to be viewable and accessible by a driver of the vehicle when the mounting structure is attached at the interior portion of the vehicle;
    wherein the light pipe is pivotally mounted at the mirror head and pivots responsive to a user actuation at the second end of the light pipe;
    wherein the light sensor senses light from rearward of the vehicle via light from rearward of the vehicle entering the light pipe at the second end of the light pipe and exiting the light pipe at the first end of the light pipe at which the light sensor is disposed;
    wherein the light sensor comprises a glare light sensor and senses glare light for electronic dimming control of the mirror reflective element; and
    wherein, responsive to the user actuation at the second end of the light pipe, the light pipe pivots and the first end of the light pipe actuates the electronic switch at the rear side of the printed circuit board.

11. The vehicular interior rearview mirror assembly of claim 10, wherein the perimeter region of the mirror head comprises a region below the mirror reflective element.

12. The vehicular interior rearview mirror assembly of claim 10, wherein the printed circuit board is disposed at and is parallel to a rear surface of the mirror reflective element.

13. The vehicular interior rearview mirror assembly of claim 10, wherein the mirror reflective element comprises an electrochromic mirror reflective element, and wherein actuation of the electronic switch by pivotal movement of the light pipe actuates or deactuates an electrochromic dimming function of the electrochromic mirror reflective element.

14. A vehicular interior rearview mirror assembly, the vehicular interior rearview mirror assembly comprising:

a mirror head pivotally mounted at a mounting structure configured to attach at an interior portion of a vehicle equipped with the vehicular interior rearview mirror assembly;

wherein the mirror head comprises a mirror casing and a mirror reflective element;

wherein the mirror reflective element comprises an electrically dimmable electro-optic mirror reflective element;

a printed circuit board disposed in the mirror head and having (i) a light sensor, (ii) an indicator light emitting diode (LED) and (iii) an electronic switch;

wherein the printed circuit board is disposed behind the mirror reflective element and has a front side that faces toward the mirror reflective element and a rear side that faces away from the mirror reflective element;

wherein the light sensor, the indicator LED and the electronic switch are disposed at the rear side of the printed circuit board that faces away from the mirror reflective element;

a multi-function light pipe disposed at the mirror head with (i) a first end disposed at the light sensor, the indicator LED and the electronic switch, and (ii) a second end disposed at a perimeter region of the mirror head so as to be viewable and accessible by a driver of the vehicle when the mounting structure is attached at the interior portion of the vehicle;

wherein the light pipe is pivotally mounted at the mirror head and pivots responsive to a user actuation at the second end of the light pipe;

wherein the light sensor senses light from rearward of the vehicle via light from rearward of the vehicle entering the light pipe at the second end of the light pipe and exiting the light pipe at the first end of the light pipe at which the light sensor is disposed;

wherein the light sensor comprises a glare light sensor and senses glare light for electronic dimming control of the mirror reflective element;

wherein light emitted by the indicator LED, when energized, enters the first end of the light pipe and exits the second end of the light pipe and is viewable by the driver of the vehicle via the driver viewing the second end of the light pipe; and wherein, responsive to the user actuation at the second end of the light pipe, the light pipe pivots and the first end of the light pipe actuates the electronic switch at the rear side of the printed circuit board, and wherein actuation of the electronic switch by pivotal movement of the light pipe actuates or deactivates an electro-optic dimming function of the electro-optic mirror reflective element.

15. The vehicular interior rearview mirror assembly of claim 14, wherein the indicator LED and the light sensor operate out of phase from one another.

16. The vehicular interior rearview mirror assembly of claim 15, wherein the light sensor senses light when the indicator LED is fully off.

17. The vehicular interior rearview mirror assembly of claim 16, wherein the indicator LED is pulsed on and off via pulse width modulation operation.

18. The vehicular interior rearview mirror assembly of claim 14, wherein the perimeter region of the mirror head comprises a region below the mirror reflective element.

19. The vehicular interior rearview mirror assembly of claim 14, wherein the printed circuit board is disposed at and is parallel to a rear surface of the mirror reflective element.

20. The vehicular interior rearview mirror assembly of claim 14, wherein the mirror reflective element comprises an electrochromic mirror reflective element.

* * * * *